United States Patent [19]

Smith

[11] Patent Number: 4,950,056
[45] Date of Patent: Aug. 21, 1990

[54] OPTICAL SYSTEM

[75] Inventor: Brian F. Smith, Rayleigh, United Kingdom

[73] Assignee: GEC-Marconi Limited, Middlesex, United Kingdom

[21] Appl. No.: 299,115

[22] Filed: Jan. 19, 1989

[51] Int. Cl.$^5$ ............................................. G02B 17/08
[52] U.S. Cl. .................................... 350/505; 350/1.2; 350/170; 350/174; 350/437; 350/438; 350/442; 350/620
[58] Field of Search ................ 350/1.1, 1.2, 442, 443, 350/444, 620, 145, 484, 437, 438, 170, 174, 505

[56] References Cited

U.S. PATENT DOCUMENTS

| | | | |
|---|---|---|---|
| 1,857,441 | 5/1932 | De Francisco | 350/170 |
| 3,235,733 | 2/1966 | Dauguet | |
| 3,514,619 | 5/1970 | Ireland | |
| 3,790,258 | 2/1974 | Rambauske | 350/620 |
| 3,950,079 | 4/1976 | Rambauske | 350/620 |
| 4,037,921 | 7/1977 | Cox | 350/145 |
| 4,118,109 | 10/1978 | Crawford et al. | 350/484 |
| 4,167,333 | 9/1979 | Young et al. | 350/437 |
| 4,364,628 | 12/1982 | Garner | 350/484 |
| 4,376,889 | 3/1983 | Swift | 350/437 |
| 4,395,095 | 7/1983 | Horton | |
| 4,822,974 | 4/1989 | Leighton | 350/484 |

FOREIGN PATENT DOCUMENTS

| | | |
|---|---|---|
| 0128815 | 12/1984 | European Pat. Off. |
| 0128815 | 12/1984 | European Pat. Off. |
| 0145845 | 6/1985 | European Pat. Off. |
| 2720990 | 11/1977 | Fed. Rep. of Germany |
| 551391 | 2/1943 | United Kingdom |
| 958253 | 2/1964 | United Kingdom |
| 1211023 | 11/1970 | United Kingdom |
| 1309230 | 3/1973 | United Kingdom |
| 1324351 | 7/1973 | United Kingdom |
| 1513314 | 6/1978 | United Kingdom |
| 1521931 | 8/1978 | United Kingdom |
| 1531893 | 11/1978 | United Kingdom |
| 2061545 | 5/1981 | United Kingdom |
| 2099171 | 12/1982 | United Kingdom |
| 2200223 | 2/1988 | United Kingdom |
| 83/00382 | 2/1983 | World Int. Prop. O. |
| 83/01311 | 4/1983 | World Int. Prop. O. |

OTHER PUBLICATIONS

Pat. Abstracts of Jap., vol. #4, #24 (E-173), 29th Feb. 1980, p. 54, E173; JP-A-54, 161 982 (Mitsubishi Denki K.K.) 22-12-1979.

Primary Examiner—Bruce Y. Arnold
Assistant Examiner—Terry S. Callaghan
Attorney, Agent, or Firm—Spencer & Frank

[57] ABSTRACT

Catadioptric optical systems are generally arranged to view a fixed large field of view. Apparatus for steering a field of view includes a pair of Risley prisms, which are disc shaped prisms having a generally shallow wedge like side cross-section, arranged in the path of the incoming radiation. The prisms are rotatable with respect to each other and to the optical axis of the system so as to steer the field of view.

By utilizing such steering in a dual waveband system then a system having two fields of view and two magnifications may be achieved in which an image over a smaller field of view but of high magnification may be steered within a larger image of large field of view but low magnification.

7 Claims, 2 Drawing Sheets

OPTICAL SYSTEM

FIELD OF THE INVENTION

This invention relates to an optical system and in particular it relates to an optical system of the catadioptric type which includes both reflective and refractive elements.

Such systems often include a first relatively large reflector having a central aperture and arranged to reflect radiation towards a second reflector from which radiation is again reflected through the aperture within the first reflector. One or more refractive elements then collimate or focus the radiation as desired. Such systems are generally designed to operate with one particular chosen frequency waveband and tend to be of a fixed field of view. Accordingly, they are useful for looking at small fixed fields of view and must be physically moved to survey a larger field of view. Infra-red thermal imagers often use such systems.

EP 0128815 A describes a system which allows for the simultaneous transmission of two fields of view which are fixed relative to one another.

SUMMARY OF THE INVENTION

According to the present invention there is provided an optical system including transmission paths for respective first and second optical beams, each having a field of view, and one or more prisms arranged so as to steer the first field of view relative to the second field of view.

The system may include one or more prisms arranged to be moveable to present different thicknesses of refracting material to incoming radiation to steer the field of view.

Preferably, steerability is achieved by means of one or more Risley prisms, which are prisms having circular main faces and shallow prism angles, as shown in FIG. 2. The prism angles are perhaps 4° or so. It is seen that if such a prism is rotated around its central axis then a field of view can be steered around a radius which is dependent upon the angle of the prism and its refractive index. By using a pair of such prisms, co-axially mounted then the field of view can be steered to anywhere within the radius determined by the two prisms.

The system may comprise a pair of Risley prisms, as described, above passing light to a concave reflector having a central aperture, which reflector reflects the radiation onto a secondary reflector and from there through the aperture within the first reflector, where further refractive elements may be situated for collimating or focusing the radiation beam and directing it to, for instance, a scanning element and detector.

Typically, the apparatus is adapted for use with infra-red radiation, although other types of electro-magnetic radiation may also be suitably used.

Embodiments of the invention will now be described by way of example only with reference to the accompanying drawings in which:

DESCRIPTION OF PREFERRED EMBODIMENTS OF THE INVENTION

Figure 1:
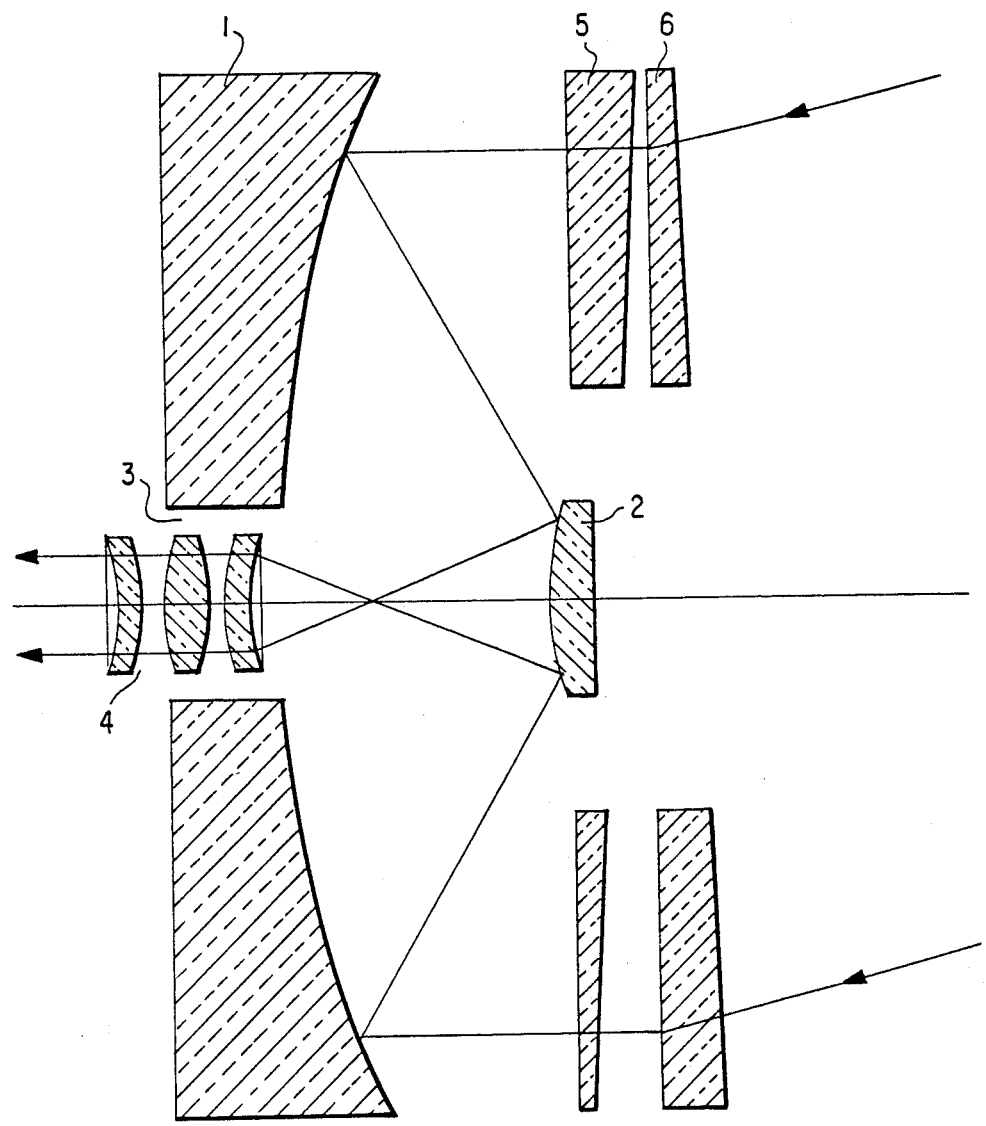
FIG. 1 shows a first optical system according to the invention.

Referring to FIG. 1, an optical system comprises a primary concave reflector 1 arranged to reflect radiation towards a smaller secondary reflector 2. The primary reflector is provided with an aperture 3 at its center where there is situated a further group 4 of lenses which serve to collimate radiation reflected from reflector 2 and to pass it towards, for instance a scanning element or elements and a detector (not shown). If the system is an infra-red one then, for example, the scanning element may be a polygon and the detector may be an array of individual infra-red detectors.

Figure 2:
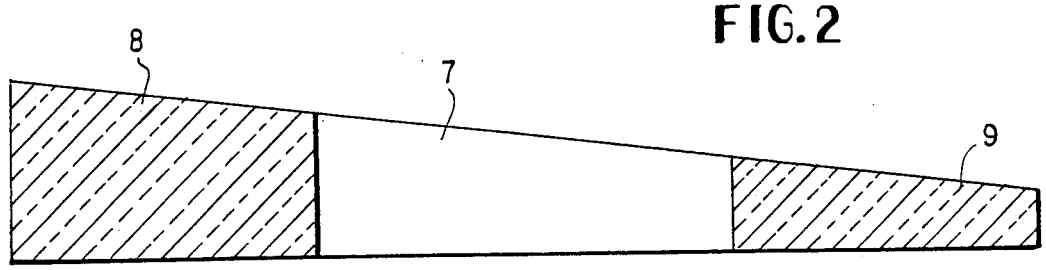
FIG. 2 shows in cross section a type of prism.

A pair of Risley prisms 5 and 6, having central apertures 7, are mounted co-axially, one in front of the other in the radiation path before the concave reflector and also in co-axial alignment with aperture 3. The prisms are shown mounted, for convenience, generally co-planar with secondary reflector 2. FIG. 2 shows a side view in cross-section of such a prism, which is a disc when viewed from above, and shows more clearly the structure which is of gently wedge-shaped cross-section, tapering gently from its first larger side 8 to its second smaller side 9.

The properties of Risley prisms are well known; by rotating the prism a beam is steered to any position on a circle whose radius is determined by the prism angle and refractive index.

By co-axially mounting two such prisms and independently rotating the prisms relative to each other the beam may be steered to any position within or on the radius determined by the combination of both prisms. This is a well known phenomenon. Apparatus according to the invention is therefore useful when a small field of view and high magnification is required since the small field of view can be steered around a larger area for, perhaps, object detection or similar processes. Typically, the radiation may be in the 3–5 or 8–12 micrometer wavebands.

Figure 3:
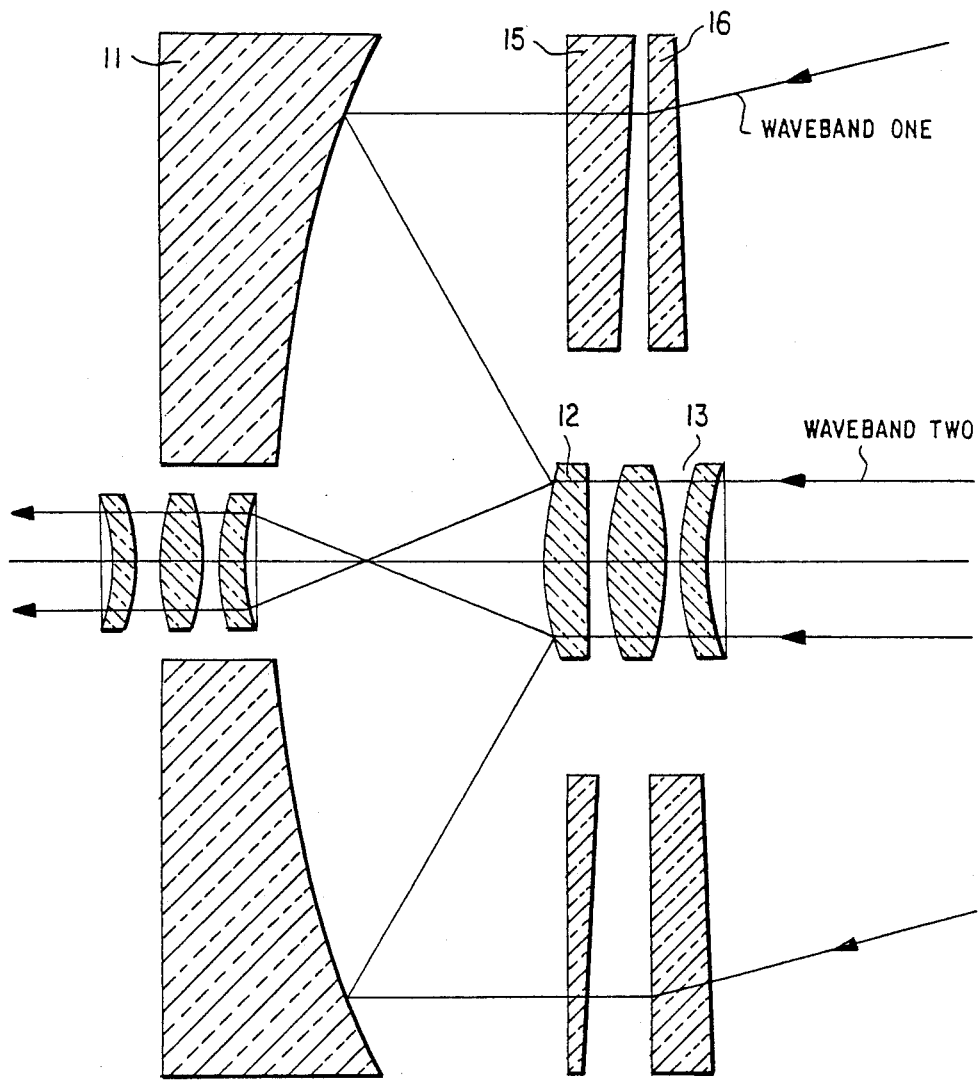
FIG. 3 shows an alternative optical system according to the invention.

FIG. 3 shows an alternative arrangement which exploits the steerability of a beam with the present invention. The applicants co-pending British Pat. application I/7499/ABA describes a system which is capable of imaging two wavebands simultaneously, one of which wavebands can be of high magnification-small field of view and the other waveband can be of low magnification-large field of view. This is achieved by means of an optical element which reflects one waveband and transmits the other. FIG. 3 shows an apparatus which combines this idea with beam steerability and includes a pair of Risley prisms 15 and 16 added in the radiation path before primary reflector 11. Reflected radiation from primary 11 is again reflected from element 12 which has the property of reflecting radiation in waveband 1 and transmitting radiation in waveband 2, which latter radiation is transmitted first through a group of elements 13. Both wavebands are then, either by reflection or transmission respectively, transmitted through the system in the normal manner to for instance a scanner and detector.

Figure 4:
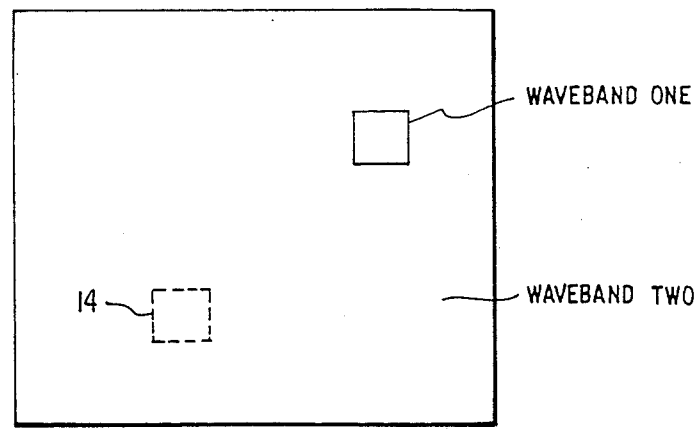

Consider the situation in which waveband two is of low magnification and large field of view and waveband one is of high magnification and small field of view. In these circumstances a scene such as that shown in FIG. 4 can be viewed in which radiation in waveband two is used to obtain an overall image of a large field of view. Radiation in waveband one represents a small field of view but of higher magnification and is shown as a smaller box within the larger one. Since the radiation in waveband one is steerable then the small area of this image is movable within the larger field of view to any desired position, such as that shown in dotted lines by position 14. In this way, a large field of view can be continually observed while smaller portions of interest may be viewed at higher magnification for easier identification of any objects within that smaller region, and these smaller regions may be steered around the larger field of view to follow whatever objects are present.

By careful selection of the optical components used both wavebands can be fully optically corrected. The wavebands may be for example 3–5 micrometers and 8–12 micrometers. Alternatively, visual radiation may be used one of the wavebands, more commonly as the large field of view-low magnification waveband so that the operator can visually align the system to look at any desired large field of view. Infra-red radiation may then be used as the high low magnification field of view waveband or alternatively, after initial setting up and alignment, both wavebands one and two could be set to be infra-red wavebands if the use of visual radiation is not required after setting-up. In such a case the optical components may be selected such that the two infra-red wavebands are optically correct to a high degree and the visual waveband to perhaps a slightly lower degree, although perfectly adequate for initial setting up purposes.

The invention thus provides the facility of having two telescopes of different fields of view and magnification within one unit and hence reduces space requirements. In addition, there is a fixed bore sight relationship between both fields of view and hence the setting up procedure is relatively simple. It will of course be noted that other beam steering arrangements than Risley prisms are also within the scope of the present invention. In some circumstances one prism may be sufficient for a limited degree of steerability. In other circumstances three or more prisms can be utilised. This can have advantages in that more complicated steering patterns cn be achieved. For instance a beam can be generally steered by the first two prisms within an overall radius equal to the field of view and then steered by the third prism within a small radius positioned anywhere within the larger one. Other patterns can be envisaged. To achieve such flexibility in steerability is difficult with only one or two prisms.

I claim:

1. An optical system comprising optical apparatus defining transmission paths for respective first and second optical beams of radiation, each optical beam of radiation having a field of view, and means including at least one prism for variably steering the field of view for said first beam of radiation relative to the field of view for the second beam of radiation.

2. An optical system as defined in claim 1 wherein the optical apparatus has an optical axis, and said means is arranged in one of the transmission paths and includes a plurality of Risley prisms mounted for relative rotation with respect to each other and to the optical axis.

3. An optical system as defined in claim 1 wherein the optical apparatus includes: an optical element having a pupil for reflecting radiation of a first waveband; a second optical element for transmitting radiation of a second waveband and reflecting radiation of the reflected first waveband, and means for passing radiation of the first and second wavebands onto the second optical element, said first and second wavebands being respectively transmitted and reflected by the second optical element through substantially the pupil, wherein radiation in only one of said wavebands is acted upon by the steering means.

4. An optical system as defined in claim 3 wherein the radiation acted upon by the steering means is of a smaller field of view than the radiation which is not steered.

5. Apparatus for steering a small field of view-high magnification image within a large field of view - low magnification image, including an optical system as defined in claim 1.

6. An optical system comprising optical apparatus defining transmission paths for respective first and second optical beams of radiation, each optical beam of radiation having a field of view, and means including at least one prism for variably steering the field of view for said first beam of radiation, wherein the optical apparatus includes: an optical element having a pupil for reflecting radiation of a first waveband; a second optical element for transmitting radiation of a second waveband and reflecting radiation of the reflected first waveband, and means for passing radiation of the first and second wavebands onto the second optical element, said first and second wavebands being respectively transmitted and reflected by the second optical element through substantially the pupil, wherein radiation in only one of said wavebands is acted upon by the steering means.

7. An optical system as defined in claim 6 wherein the radiation acted upon by the steering means is of a smaller field of view than the radiation which is not steered.

* * * * *